United States Patent Office 3,340,306
Patented Sept. 5, 1967

3,340,306
PROCESS FOR THE DEMETALIZATION OF
OLEFIN OXOSYNTHESIS MIXTURES
Harry Endler and Silvio Pappada, Ferrara, Italy, assignors
to Montecatini Edison S.p.A., Milan, Italy, a corporation of Italy
No Drawing. Filed Nov. 8, 1963, Ser. No. 322,505
Claims priority, application Italy, Nov. 15, 1962,
22,441/62
10 Claims. (Cl. 260—604)

Our invention relates to a process for treating the reaction mixtures of the oxosynthesis of olefins, more particularly propylene and butene, in order to decompose and eliminate the metallic catalytic residues contained in the mixtures. Specifically the invention relates to the elimination of the catalytic metallic compounds, or of their conversion products, in the catalytic active form making them available for recycling to the oxosynthesis reaction.

Processes for the synthesis of aldehydes from olefins by treatment under conditions of high temperature and pressure, with mixtures of carbon monoxide and hydrogen are known. Those processes, usually called "oxosynthesis," involve the use of catalysts consisting of heavy metal compounds, particularly from Group VIII of the Periodic Table, either soluble or insoluble in the reaction mixture. It is believed that the catalyst metals, under the reaction conditions, are transformed into metal carbonyls or hydrocarbonyls which are the true catalytic agents for the oxosynthesis, and hence can also be added in this form at the beginning of the process. The oxosynthesis reaction mixture therefore contains (in addition to one portion of the olefin, unreacted carbon monoxide, hydrogen, and the solvent, if any) the reaction products (prevailingly aldehydes together with minor amounts of alcohols, esters and acetals), the metal carbonyls, a portion of the initial metal compounds and their products of secondary reaction with some of the reaction products (namely acids), and with the mixture carbon monoxide +hydrogen (metal formates, acetates, etc.). These metal compounds in various forms should be eliminated from the reaction mixture before subjecting it to further treatments, as for example hydrogenation to alcohols. This is necessary because under the new reaction conditions the metal compounds tend to decompose with the formation of free metals, which inactivate or poison the hydrogenation catalysts or deposit themselves onto the walls, pipes, valves, etc., thus causing clogging, and also with the formation of carbon monoxide which can remarkably disturb the hydrogenation step. The removal of the metal compounds is also needed because they catalyze side condensation reactions of the aldehydes also at the temperatures normally used for their separation.

In some cases, furthermore, the nature and cost of the metal compounds used (e.g. the cobalt compounds) require their recovery and recycling, after activation, to the oxosynthesis reaction.

For the so-called demetalization (usually a decobaltation) of the reaction products of the olefin oxosynthesis, various methods have been proposed. It has been proposed, for example, to treat the oxosynthesis mixtures at high temperature, in the presence or absence of hydrogen, in order to favor the thermal decomposition of the metal carbonyls.

It has been also proposed to contact the mixture with water or steam for extracting the metal compounds in the aqueous phase. Another method proposed was to facilitate the dissolution in the aqueous phase by addition of mineral acids (hydrochloric acid, sulfuric acid) or organic acids (acetic, formic, oxalic acid, etc.). Finally, it has been proposed to contact the oxosynthesis mixtures with copper metal in order to cause the precipitation of the metals of the catalytic residues.

These various methods have some disadvantages, particularly when it is important to recover the metal compounds in a form which can be easily or immediately reused in the oxosynthesis stage, that is, in the form of compounds which can be easily carbonylated. The precipitation as metals raises problems of separation and of cleaning the thermal demetalization reactors.

The extraction with aqueous solutions generally gives very diluted products involving problems of concentration.

We have now found a simple and effective method for eliminating the metal compounds, specifically cobalt compounds, from the oxosynthesis reaction mixtures. We eliminate them in the form of compounds which are soluble or insoluble in the oxosynthesis products, but can be easily and completely re-carbonylated to a catalytically active form recyclable to the oxosynthesis reactor. The method of this invention consists of heat treatment under atmospheric or similar pressure, in the presence of non-aqueous organic acids, on the reaction mixture. We thus obtain the transformation of the carbonyls and other metal compounds, if any, mostly into salts of fatty acids, which are easily carbonylated.

This process is particularly convenient in the decobaltation of the reaction mixtures obtained by oxosynthesis of propylene or butene. Here the decobaltation can take place contemporaneously with the process of separation of the unreacted gases (olefin, carbon monoxide and hydrogen) and of the relatively volatile aldehydes. This is done by flashing (distillation by expansion) of the raw reaction mixtures, and adding the required amounts of fatty acids before the expansion step and preferably before the heating to the flash point.

The fatty acil concentration in the mixture must be sufficient to assure the total formation of the corresponding organic salts of the metals present therein, that is as least in the stoichiometric amount. An excess varying from 100 to 300% with respect to the stoichiometric amount is preferably used.

As acids we may use the aliphatic monocarboxylic acids containing 2 to 10 carbon atoms, either linear or not, specifically acetic, propionic, butyric, isobutyric, valerianic, 2-ethylhexanoic acid, and the like alkanoic acids. A particularly advantageous feature of the invention is the fact that, as a rule, a given amount of the monocarboxylic acids is already present, generally in a concentration lower than that required for the complete dissolution of all the metal residues in the raw oxosynthesis mixture and, therefore, for the purposes of the present invention the addition of a lower amount of the same acids is sufficient.

Depending on the type of acids used, the metallic compounds are transformed into their respective organic salts, either insoluble (e.g. the salts of acetic, propionic or butyric acids) or soluble (e.g. the salts of 2-ethylhexanoic acid) in the organic phase obtained after separation of the aldehydes. Thereafter the organic salts are in a convenient form which then can be transformed substantially into catalytically active components by re-carbonylation, thereby making them available for recycling to the oxosynthesis. The use of butyric acids is especially convenient in the decobaltation of the raw mixture obtained by oxosynthesis of propylene because an appreciable amount of these acids is already present in the reaction liquid. The formation of these acids during the synthesis is attributable to side reactions. Specifically the cobalt is recovered mostly in the form of cobalt butyrate, which is insoluble in the oxocompounds and can be recycled as is. The use, in the thermal decobaltation, of acids with 8 carbon atoms allows the recovery of cobalt in the form of cobalt octoate which is soluble in the oxocompounds. On the basis of the solubility of cobalt octoate in the organic liquids and specifically in the side products of the oxosynthesis, up to a weight ratio of 2:1, it is possible to separate from the total raw product of the synthesis a cobalt octoate solution which is directly recycled to the oxosynthesis.

Regarding the composition of the oxosynthesis mixtures with the cobalt catalyst, it has been found that the thermal decomposition of cobalt carbonyls, dissolved in the liquid coming from the oxosynthesis of propylene, due to the presence of various organic acids as side products, substantially leads to the formation of the respective cobalt salts. Of these acids, formic acid and butyric acids (iso and normal) are present in general in concentration of 2–3 gm./liter and 10–15 gm./liter respectively. The other organic acids, if any are present in the raw product, identify themselves with the anion corresponding to the cobalt salt used in the synthesis as promoter of carbonyls. For instance in the thermal decobaltation of a synthesis raw product containing formic acid and butyric acids, there is obtained a mixture of salts consisting of cobalt formate, cobalt butyrate and of small amounts of metallic cobalt.

The formation of metallic cobalt is not influenced by the decomposition temperature and by a high concentration of cobalt carbonyls. On the contrary, the formation of formate is favored at high temperature with decrease of equivalent amount of cobalt butyrate. It is evident that the composition of the total mixture of salts, obtained by thermal decomposition of the carbonyls, has a determining importance on the convertibility of each component of the same mixture into carbonyls. The inactive components, with respect to the carbonylation, are metallic cobalt and cobalt formate while the active component consists of cobalt butyrate.

We have now found that in the thermal decobaltation it is possible to obtain a mixture of salts almost entirely consisting of cobalt butyrate. This is accomplished if, in the decobaltation, a higher amount of butyric acid is used, in addition to that already pre-existing in the liquid, due to oxosynthesis of propylene.

More particularly we have found that if an amount of butyric acid corresponding to 30 gm./liter is added to the reaction liquid, the formation of cobalt formate is reduced to small amounts, not higher than 3%. In addition to this mechanism of decobaltation, it has also been found that it is possible to recover the cobalt contained in the form of carbonyls in the reaction liquid. This is done by transforming them completely into 2-ethyl hexanoate, which is soluble in the oxocompounds, by action of acids containing 8 carbon atoms which participate in the thermal decomposition of carbonyls. Furthermore the amount of acids containing 8 carbon atoms to be added to the reaction liquid at the end of the oxosynthesis should amount at least to 30 gm./liter in order to recover 98% of cobalt in the soluble form.

With $C_8$ acids amounts progressively lower than the limiting concentration of 30 gm./liter, cobalt is only in part transformed into soluble salts because substantial amounts of solid consisting of cobalt butyrate, cobalt formate and small amounts of metallic cobalt are formed at the same time.

The temperature at which the cobalt carbonyls, contained in the soluble state in the raw products coming from the oxosynthesis of propylene, are treated with fatty acids according to the present invention is between 80 and 160° C. The thermal treatments are preferably carried out under atmospheric pressure for 30 minutes.

We have found that the process for the thermal decobaltation by action of acids containing 4 carbon atoms leads to the recovery of cobalt in the form of a mixture of salts consisting of 95% of cobalt butyrate and for the rest of small amounts of cobalt formate and metallic cobalt. The process of thermal decobaltation with $C_8$ acids makes it possible to recover cobalt in the proportion of 97.2% in the form of cobalt octoate which is soluble in the oxosynthesis products, the formation of a solid phase being negligible.

The following examples will serve to illustrate the invention without limiting its scope.

Example 1

700 cc. of oxocompounds coming from the oxosynthesis of propylene and containing in the soluble state 5.79 gm. of cobalt as cobalt carbonyls, were charged into a one-liter stainless steel autoclave. In this mixture of oxocompounds, besides butyric aldehydes and the side products of the synthesis (esters, alcohols, acetals and higher aldehydes) also small amounts of formic acid and butyric acids in concentration of 3 gm./liter and 12 gm./liter, respectively, were present.

21 gm. of butyric acid were charged at the same time. After removal of the air contained in the free volume of the autoclave by careful washing with a gas having the composition carbon monoxide:hydrogen=1:1, the pressure was brought to 180 kg./cm.$^2$ with the gas having the following composition: carbon dioxide=1.6%; carbon monoxide=45.4%; hydrogen=47%; inert+nitrogen=6.0%.

The content of the autoclave was then heated to 120° C. by means of an electric furnace regulated automatically. The temperature of the reaction liquid was measured with a thermocouple ($\pm 2°$ C.)

When this temperature was reached, the pressure was brought to atmospheric pressure and the temperature of 120° C. was maintained for 30 minutes. After cooling, the contents of the autoclave were discharged in order to quantitatively recover the solid phase formed and the reaction liquid. The recovered solid contained 95% of cobalt butyrate, 3% of cobalt formate and a very small amount, lower than 2%, of metallic cobalt.

Example 2

According to the method of Example 1, 700 cc. of the same mixture of oxocompounds containing 3.15 gm. of cobalt in the soluble state as cobalt carbonyls and 10.5 gm. of $C_8$ acids (prevailingly 2-ethylhexanoic acid) were charged into the autoclave.

After decobaltation carried out at 120° C. according to the method of Example 1, the organic phase and the solid formed were discharged from the autoclave.

The cobalt dissolved in the organic phase as cobalt octoate amounted to 2.59 gm. of cobalt, corresponding to a recovery of 82.2% of the cobalt introduced into the autoclave.

The cobalt contained in the whole solid recovered, amounted to 0.54 gm., corresponding to a recovery of 14% of the cobalt introduced into the autoclave.

This solid had the following composition: cobalt butyrate 66%, cobalt formate 14%, metallic cobalt 10%.

Example 3

According to the method of Example 1, 700 cc. of the same mixture of oxocompound, containing 3.15 gm. of cobalt in the form of carbonyls and 21 gm. of $C_8$ acids (prevailingly 2-ethylhexanoic) were charged into the autoclave.

After decobaltation carried out at 120° C. according to the method of Example 1, the cobalt contained in the organic phase in the soluble state, as cobalt octoate, amounted to 3.06 gm., corresponding to a recovery of 97.1% of the cobalt introduced into the autoclave.

In this case, the formation of the solid was reduced to negligible traces.

Example 4

The activity of the carbonylation of the cobalt salts formed in the thermal decomposition of the cobalt carbonyls due to the action of $C_4$ or $C_8$ acids, has been tested according to the procedures reported in the present example.

9 gm. of cobalt as cobalt salt and 3 gm. of preformed cobalt octocarbonyl, dissolved in a small amount of toluene, were introduced into a 1-liter oscillating autoclave heated by an automatically regulated electric furnace. The temperature was measured by means of a thermocouple ($\pm 2°$ C.) and the pressure by means of a precision manometer.

The gas used in the following operations had the following composition: carbon dioxide=1.6%; carbon monoxide=45.4%; hydrogen=47%; inert+nitrogen=6%.

After introduction of 500 cc. of toluene, the autoclave was closed and various washings were carried out with the gas described above in order to completely remove the air contained in the free volume of the autoclave. 10 atmospheres of gas were then introduced and the temperature was raised to 150° C. At this temperature the pressure was adjusted to 200 atmospheres in order to start the carbonylation reaction and during this time the pressure was kept constant at 200 atmospheres by reintegrating the gas as soon as it was consumed.

After about 1 hour the reaction was stopped. The contents of the autoclave was cooled to room temperature and then the gas was discharged. The assay of the carbonyls (dicobalt octacarbonyls and cobalt hydrocarbonyls), thus formed, was carried out according to the gas-volumetric method of Sternberg H. W., Wender I. and Orchim. M.: Anal. Chem. 24,174 (1952). In the carbonylation of colbalt octoate the conversion of cobalt into carbonyls amounted to 90%. In case of cobalt butyrate a conversion into carbonyls of 90% was also obtained.

Anhydrous or monohydrate cobalt formate on the other hand had a very poor activity of carbonylation, with a conversion of 8–10% into carbonyls.

We claim:

1. A process for the demetalization of the reaction mixtures of the oxosynthesis of olefins, which comprises subjecting said mixtures to a heat treatment at temperatures between 80° C. and 160° C. in the presence of a non-aqueous alkanoic acid containing 2 to 8 carbon atoms.

2. A process for the demetalization of the reaction mixtures of the oxosynthesis of olefins, which comprises subjecting said mixtures to heat treatment at temperatures between 80° C. and 160° C., in the presence of a non-aqueous butyric acid.

3. A process as in claim 1, wherein the alkanoic acid is 2-ethylhexanoic acid.

4. A process for the demetalization of the reaction mixtures of the oxosynthesis of olefins, which comprises heating said mixtures at a temperature of about 120° C. in the presence of a non-aqueous alkanoic acid containing 2 to 8 carbon atoms.

5. The process of claim 4, wherein alkanoic acid is 2-ethylhexanoic acid.

6. The process of claim 4, wherein the alkanoic acid is butyric acid.

7. A process for the demetalization of the reaction mixtures of the oxosynthesis of olefins, which comprises subjecting said mixtures to heat treatment at a temperature of about 120° C. in the presence of a non-aqueous alkanoic acid containing 2 to 8 carbon atoms, the quantity of said acid being sufficient for total formation of the corresponding organic salts from the metals present therein and consisting of at least the stoichiometric amount and an excess not exceeding 300% in respect to the metal present.

8. A process for the demetalization of the reaction mixture of the oxosynthesis of propylene, which comprises heating said mixture for up to 60 minutes at a temperature of about 120° C., in the presence of non-aqueous 2-ethylhexanoic acid.

9. A process for the demetalization of the reaction mixture of the oxosynthesis of propylene, which comprises subjecting said mixture to heat treatment at a temperature of about 120° C., in the presence of non-aqueous butyric acid.

10. A process for the demetalization of the reaction mixture of the oxosynthesis of propylene, which comprises heating said mixture in an autoclave for approximately 30 minutes at a temperature of about 120° C. in the presence of a non-aqueous alkanoic acid having 2 to 8 carbon atoms.

References Cited

UNITED STATES PATENTS 2,744,921    5/1956    Mertzweiller et al. ___ 260—604

LEON ZITVER, *Primary Examiner.*

BERNARD HELFIN, *Examiner.*

R. H. LILES, J. J. SETELIK, *Assistant Examiners.*